US012789763B1

(12) United States Patent
Lamoncha

(10) Patent No.: US 12,789,763 B1

(45) Date of Patent: *Nov. 10, 2026

(54) SAFETY SYSTEMS FOR RAILROAD TRAINS AND CARS, METHODS FOR OPERATING OF THE SAME

(71) Applicant: Mark Lamoncha, Columbiana, OH (US)

(72) Inventor: Mark Lamoncha, Columbiana, OH (US)

( * ) Notice: Subject to any disclaimer, the term of this patent is extended or adjusted under 35 U.S.C. 154(b) by 63 days.

This patent is subject to a terminal disclaimer.

(21) Appl. No.: 18/930,235

(22) Filed: Oct. 29, 2024

Related U.S. Application Data

(63) Continuation-in-part of application No. 18/763,538, filed on Jul. 3, 2024, which is a continuation-in-part of application No. 18/126,132, filed on Mar. 24, 2023, now Pat. No. 12,054,184.

(60) Provisional application No. 63/451,782, filed on Mar. 13, 2023.

(51) Int. Cl.
*B60T 7/12* (2006.01)

(52) U.S. Cl.
CPC ........... *B60T 7/12* (2013.01); *B60T 2201/022* (2013.01); *B60Y 2200/30* (2013.01)

(58) Field of Classification Search
CPC ...... B60T 7/12; B60T 17/18; B60T 2201/022; B60T 2201/024; B60Y 2200/30–33; B61L 99/00; B61L 99/002
See application file for complete search history.

(56) References Cited

U.S. PATENT DOCUMENTS

| | | | | |
|---|---|---|---|---|
| 6,417,765 | B1 * | 7/2002 | Capanna | B61L 23/041 246/166 |
| 7,755,660 | B2 | 7/2010 | Nejikovsky et al. | |
| 8,934,007 | B2 | 1/2015 | Snead | |
| 9,151,681 | B2 | 10/2015 | Arndt et al. | |
| 9,365,223 | B2 | 6/2016 | Martin et al. | |
| 9,561,811 | B2 | 2/2017 | Traylor et al. | |
| 10,031,225 | B2 * | 7/2018 | Staynov | B60W 30/14 |
| 10,137,915 | B2 | 11/2018 | LeFebvre et al. | |
| 10,549,763 | B2 * | 2/2020 | Brooks | B61C 17/00 |
| 10,796,192 | B2 | 10/2020 | Fernandez | |
| 10,906,571 | B2 | 2/2021 | Mian | |
| 11,214,288 | B2 | 1/2022 | Ghaly | |
| 11,349,589 | B2 | 5/2022 | Carlson et al. | |
| 12,552,418 | B2 * | 2/2026 | Nativ | B61B 13/06 |

(Continued)

OTHER PUBLICATIONS

Охотников, EA 042033, original and machine translation. (Year: 2022).*

(Continued)

*Primary Examiner* — Mark L. Greene

(74) *Attorney, Agent, or Firm* — Standley Law Group LLP; Jeffrey S. Standley; Adam J. Smith

(57) ABSTRACT

A safety system and related methods for a train are disclosed. A control system receives data from a forward-looking sensor unit and processes the received data to determine if one or more abnormalities meeting predetermined criteria are present. Where the control system confirms the presence of at least one of the one or more abnormalities is determined, the control system activates at least one of one or more safety devices located at a car or the engine of the train, which when activated, slow the train.

19 Claims, 9 Drawing Sheets

(56) References Cited

U.S. PATENT DOCUMENTS

| | | | | |
|---|---|---|---|---|
| 2012/0274772 | A1* | 11/2012 | Fosburgh | G01C 11/04 348/149 |
| 2019/0176862 | A1 | 6/2019 | Kumar et al. | |
| 2019/0300033 | A1 | 10/2019 | Carlson et al. | |
| 2021/0253150 | A1 | 8/2021 | Ghaly | |
| 2021/0403062 | A1* | 12/2021 | Bramucci | B61L 3/125 |
| 2023/0005374 | A1* | 1/2023 | Elimaleh | G08G 1/0112 |

OTHER PUBLICATIONS

Wikipedia, Defect Detector, webpage, date accessed Mar. 2, 2023, 7 pages.

Elbein, Saul, Four systemic safety issues the East Palestine crash report may point to, web article, date accessed Mar. 2, 2023, 17 pages.

Bureau of Transportation Statistics, Train Fatalities, Injuries, and Accidents by Type of Accident, https://www.bts.gov/content/train-fatalities-injuries-and-accidents-type-accidenta, date accessed Oct. 4, 2024, 1 page.

* cited by examiner

SAFETY SYSTEMS FOR RAILROAD TRAINS AND CARS, METHODS FOR OPERATING OF THE SAME

CROSS-REFERENCE TO RELATED APPLICATIONS

This application is a continuation-in-part of U.S. application Ser. No. 18/763,538 filed Jul. 3, 2024, which is a continuation-in-part of U.S. application Ser. No. 18/126,132 filed Mar. 24, 2023, which claims the benefit of U.S. Provisional Application Ser. No. 63/451,782 filed Mar. 13, 2023, the disclosures of which are hereby incorporated by reference as if fully restated herein.

TECHNICAL FIELD

Exemplary embodiments relate generally to safety systems for railroad cars and trains, such as which utilize automatically activated safety devices and multi-party override requirement features, as well as methods for operating the same.

BACKGROUND AND SUMMARY OF THE INVENTION

The railroad derailment in East Palestine, Ohio on or about Feb. 3, 2023 is but one of many railroad derailments, crashes, or other safety incidents in the United States. The US Federal Railroad Administration reports an average of 1,475 train derailments per year between 2005-2021 (https://www.bts.gov/content/train-fatalities-injuries-and-accidents-type-accidenta). However, all forms of transportation have imperfect safety records, and railroad transportation provides several advantages including a relatively high level of energy efficiency when transporting relatively large or heavy goods and relatively high capability for transporting such relatively large or heavy goods compared to many other forms of transportation. Furthermore, despite an imperfect safety record, railway transportation is, in many ways, a safer mode of transport for relatively hazardous cargo, especially in large quantities. Thus, maximizing the safe travel of trains, which commonly transport relatively large and hazardous loads, is of particular importance. Therefore, what is needed are safety systems for railroad cars and trains.

Safety systems and methods for railroad cars and trains are provided. Conventionally, railway safety features typically utilize a number of rail-based sensors and systems, or other fixed sensors or manned outposts located adjacent railways. However, it is expensive to outfit or retrofit rails with these systems. Therefore, one particular advantage of the present disclosure includes providing a train-based system which does not rely on modifying underlying railways themselves. Further, these systems only provide periodic glimpses into the state of a train or railcar. Therefore, one particular advantage of the present disclosure includes providing near real-time monitoring of train or rail car status.

Additionally, conventional approaches provide reporting to a train operator or railroad company. However, train operators or railroad companies may not be aware of all the local potential impacts from derailment or continued transit, particularly of hazardous, large, or heavy cargo, and the benefits of collaboration with local authorities to execute duties properly. Therefore, one particular advantage of the present disclosures includes providing a multi-party override requirement, at least one party of which may be an outside authority, such as a local government official, which may facilitate local authority input and collaboration to enhance safety and efficacy.

Further still, conventional approaches may require intervention or judgment by a train operator or railroad company. However, train operators or railroad companies may be naturally incentivized to continue transit uninterrupted, may be unable to execute duties properly, or may exercise improper judgment. Therefore, one particular advantage of the present disclosures includes providing automated activation of safety devices, and may include a normally activated approach which is triggered unless a safety authorization signal is consistently received.

Rail cars may be outfitted with a number of sensors. The sensors may include temperature sensors and/or frequency sensors, though other types and kinds of sensors may be utilized. The sensors may be placed at axles and/or wheel bearings, though other locations may be utilized. The sensors may report data to a controller, preferably located at the lead locomotive engine, though any location may be utilized. For example, each rail car may have its own set of sensors which report to a dedicated control unit. In this fashion, the rail cars may operate independently, or the dedicated control units may all report to a main control unit. Communication may be established by wired and/or wireless connection. Regardless, sensor data may be monitored and where any established safety parameter is reached, one or more safety devices may be activated. Other information may be reported, including cargo information. The safety devices may include, but are not limited to, speed reduction routines, engine shut down and/or lock-out routines, wheel brakes, control lockouts, combinations thereof, or the like.

Proximate and/or advance jurisdictional authorities may be automatically notified of the safety feature activation and/or safety parameters exceeded, such as by way of the controller. For example, the train's location may be determined by the controller and notifications may be provided to one or more proximate authorities based on the jurisdictional district(s) the train is currently located in and/or moving towards. The controller may be configured to prevent deactivation of the safety devices and/or prevent at least certain of user input from operator interfaces of the train from normal or full processing unless and until a multi-party override is received. The multi-party override may be required from both a previously registered representative of the railroad owner or operator and a previously registered representative of the proximate governmental authority, by way of non-limiting example. The override may be provided in the form of an authenticated signal, encrypted key, password, presentation of an authentication device, combinations thereof, or the like.

The controller may be configured to operate a safety subroutine whereby normal operations of the locomotive are only permitted so long as a safety signal is consistently received from one or more remote devices, such as associated with the railroad owner or operator and/or the proximate governmental authority. The safety signal may be provided in the form of an authenticated signal, encrypted key, password, presentation of an authentication device, combinations thereof, or the like. Where the safety signal is not received, the safety devices may be automatically activated, requiring the multi-party override for deactivation and resumption of normal operations.

In certain exemplary embodiments, each car may be independently monitored, operated, and/or powered such as by a localized controller and/or power supply (e.g., solar, wind, and/or battery). This may permit safety devices to be activated for individual cars, which may slow an entire train. Coupling devices may be operated automatically, such as one of the safety devices. This may, by way of non-limiting example, allow individual, potentially problematic cars to be decoupled and moved to a siding, for example, while the train is permitted to travel on, for example without limitation.

The system may include a transponder. The transponder may be configured to determine and/or report data regarding location of the car and/or its cargo. Each of the cars may include an independent transponder by way of non-limiting example. Transponder information may be automatically passed to the remote devices when the respective car is within a predetermined proximity thereof and/or a respective jurisdictional district. Alternatively, or additionally, the transponders may be activated when one or more of the parameters are met or exceeded such that the transponders are another safety device.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
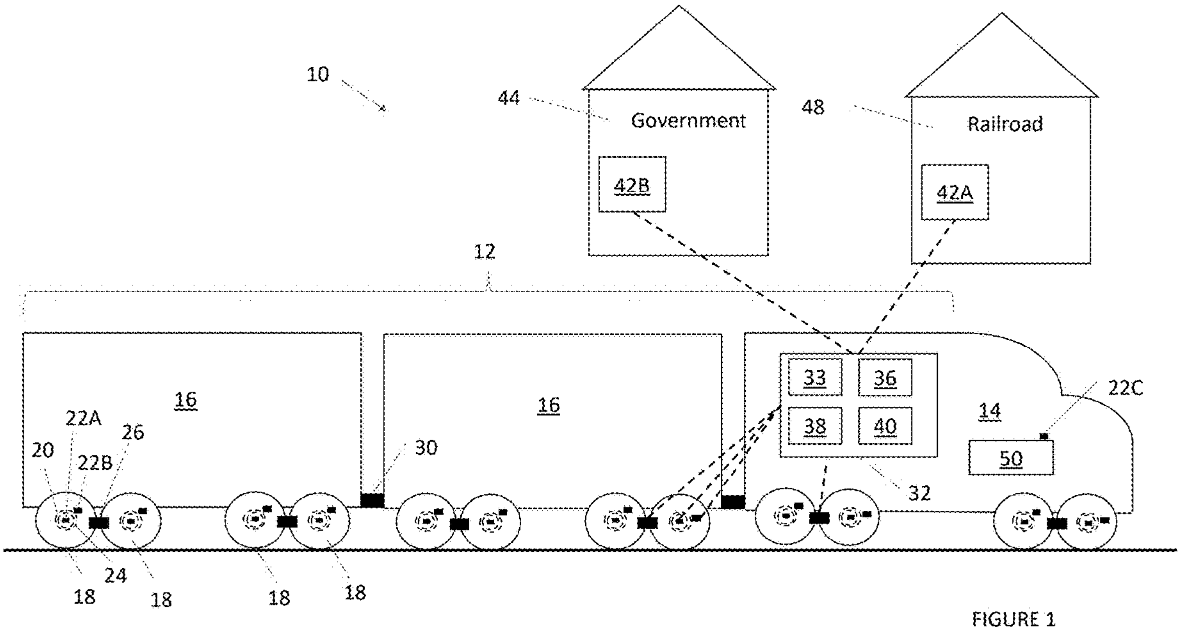
FIG. 1 is a simplified diagram for an exemplary railroad safety system.
Figure 3:
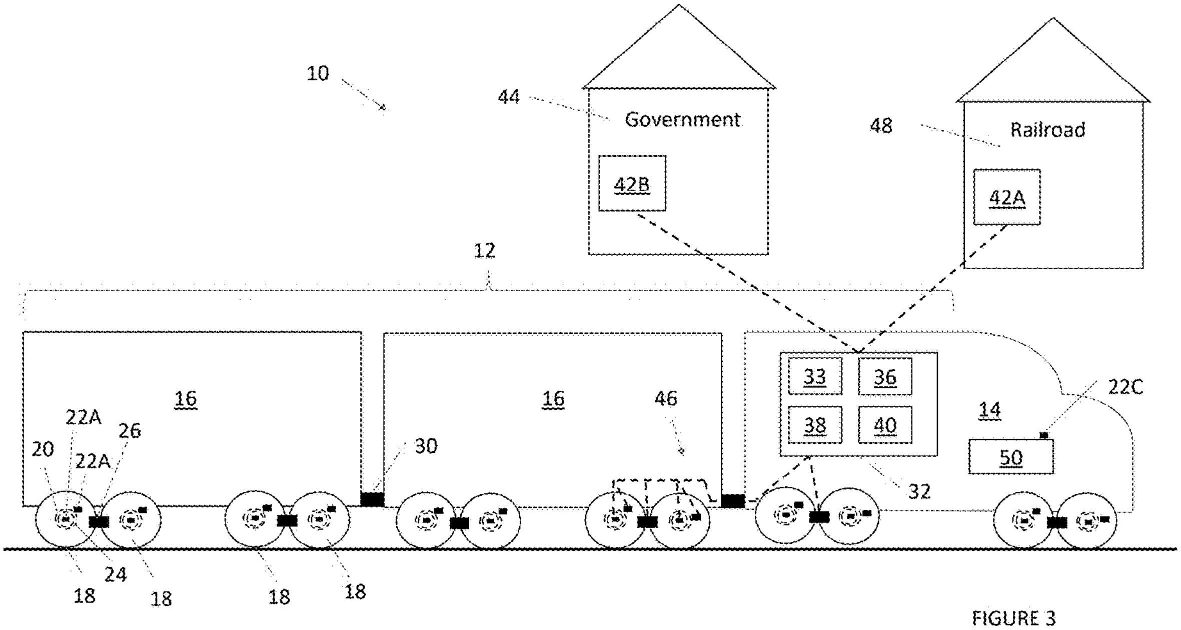
FIG. 3 is a simplified diagram for another exemplary embodiment of the railroad safety system of FIG. 1.

FIG. 1 though FIG. 3 illustrate various embodiments of a railroad safety system 10. The system 10 may be configured to work with any type of kind of train 12. The train 12 may comprise any number, type, and/or kind of cars 16, such as for cargo (e.g., box cars, flat cars, tank cars, cattle cars, hoppers, gondolas, or the like), passengers (e.g., sleeping compartment, seating compartments, dining cars, entertainment cars, sightseeing cars, or the like), combinations thereof, or the like. The train 12 may comprise any number, type, and/or kind of locomotives 14. The locomotive(s) 14 may comprise one or more propulsion systems 50. The locomotive(s) 14 may be diesel powered, electrically powered, gas turbine powered, battery powered, combinations thereof, or the like and may comprise one or more related propulsion systems 50 and/or components.

Some or all cars 16 and/or locomotives 14 of the train 12 may be outfitted with sensors 22. In exemplary embodiments, the sensors 22 are located at or near the wheels 18, though the sensors 22 may be located anywhere. The sensors 22 may include temperature and/or frequency sensors, though any type and/or kind of sensor 22 may be utilized. In exemplary embodiments, without limitation, at least one sensor 22A is positioned at or adjacent an axle 20 of a wheel 18, and at least one other sensor 22B is positioned at or adjacent to a wheel bearing assembly 24 of the wheel 18 for each wheel 18 or each car 16 and/or locomotive 14 of the train 12. However, any number of sensors 22 of any type or kind may be used at any location(s) for some or all wheels 18 of some or all cars 16 and/or locomotives 14 of the train 12. Alternatively, or additionally, at least one sensor 22C may be positioned at or adjacent to the propulsion system 50 of each locomotive 14.

Each of the wheels 18 may comprise or be associated with a braking subsystem 26. The braking subsystem 26 may be configured to automatically apply braking forces to the wheels 18 such as by way of one or more motors, levers, hydraulics, springs, combinations thereof, or the like. Some or all wheels 18 of some or all cars 16 and/or locomotives 14 of the train 12 may include their own, or a shared, braking subsystem 26. The braking subsystems 26 may be configured to normally provide braking forces or normally provide otherwise free movement of the wheels 18.

In exemplary embodiments, without limitation, the braking subsystem 26 may comprise a pneumatic system which is configured for normal activation to apply braking force to the wheels 18 when one or more pneumatic lines otherwise applying force to maintain the braking elements off the wheels 18 are cut, uncoupled, or the like. The braking subsystem 26 may comprise a cutting or pulling device, such as but not limited to one or more spring biased cutting edges, configured to automatically cut the pneumatic lines when an electronic command is received thereby causing the braking elements to contact, and apply for to, the wheels 18. As another example, without limitation, the braking subsystem 26 may comprise electromagnetic elements configured to be normally demagnetized, and when activated, pull or hold the braking elements away from the wheels 18. The braking subsystem 26 may be configured to demagnetize the electromagnetic elements upon command, thus causing the braking elements to contact, and apply for to, the wheels 18.

These are merely exemplary and not intended to be limiting. Other type and kinds of automated braking systems may be utilized. Regardless, upon command (or lack of receipt of a command to the contrary) some or all of the braking subsystems 26 may be configured to apply braking forces at the wheels 18 for individual cars 16 and/or locomotives 14 and/or the entire train. In this fashion, the individual cars 16 may be slowed and/or stopped, such as to control the cars 16 individually and/or slow or stop some or all of the train 12. Alternatively, the entire train 12 may be braked, such as to maximize rate of slow.

The sensors 22 may be in electronic communication with a controller 32. The controller 32 may be located at a lead one of the locomotives 14, though the controller 32 may be located at any car 16 and/or locomotive 14 of the train 12, or remote from the train 12. The sensors 22 may be configured for wireless or wired communication with the controller 32.

As illustrated with particular regard to FIG. 1, for example without limitation, each of the sensor 22 may wirelessly communicate data to the controller 32. The controller 32 may also be in wireless communication with the braking subsystems 26, such as to transmit braking commands and/or receive data regarding braking status. The controller 32 may also be wireless communication with the propulsion systems 50, such as to transmit shut down, power reduction, or speed reduction commands, routines, and/or the like. Alternatively, or additionally, the controller 32 may be configured to receive data regarding propulsion system 50 status from the propulsion system 50 and/or the sensors 22C. Such wireless communication may be accomplished by a wireless transmitter/receiver 33 located at the controller 32. The wireless communication may operate using a local area network, ad hoc network, mesh network, near field communication protocols, internet protocols, cellular networks, the world wide web, an internet, an intranet, combinations thereof, or the like.

Figure 2:
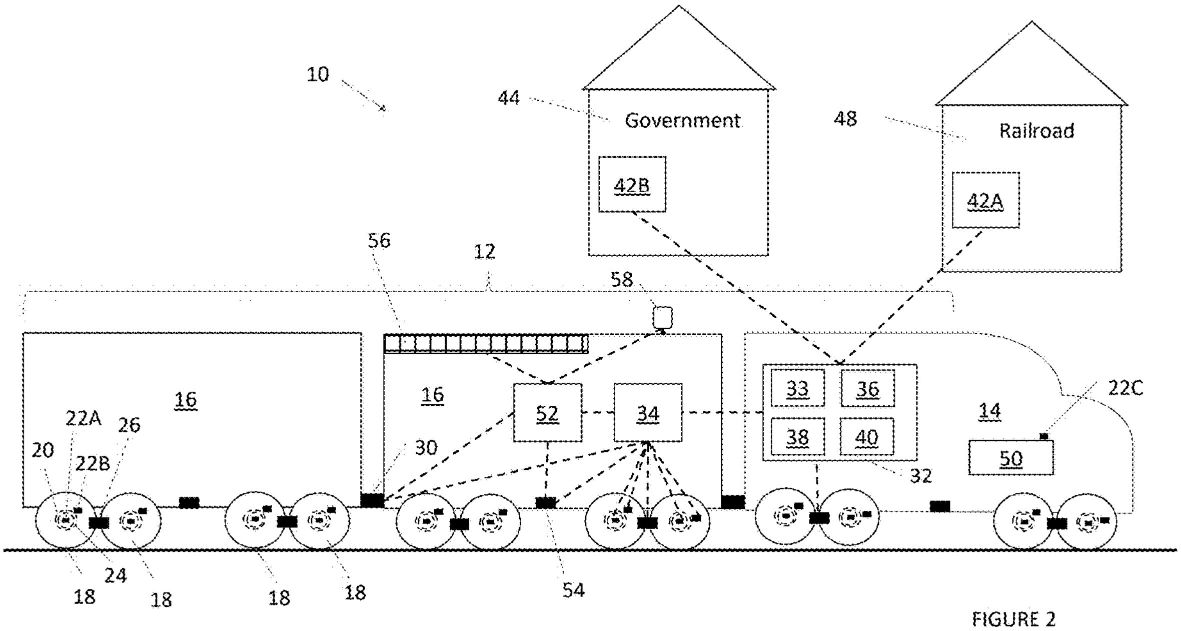
FIG. 2 is a simplified diagram for another exemplary embodiment of the railroad safety system of FIG. 1.

As illustrated with particular regard to FIG. 2, as another non-limiting example, some or all cars 16 of a train 12 may contain a dedicated control subsystem 34 to which each or the sensors 22 and/or braking subsystems 26 are in wired and/or wireless communication. Each of the control subsystems 34 may be in wired or wireless communication with the controller 32. In embodiments where one or more dedicated control subsystems 34 are utilized, the controller 32, which may be located at the lead one of the locomotives 14 by way of non-limiting example, may sometimes be referred to herein as a master control unit.

As illustrated with particular regard to FIG. 3, as another non-limiting example, wiring 46 may extend between some or all of the cars 16 and/or locomotives 14 to provide a wired connection. In exemplary embodiments, without limitation, such wiring 46 may extend along, within, or adjacent the coupling devices 30 between the cars 16 and/or locomotives 14 of a train 12.

The wireless options shown and/or described herein may allow greater flexibility in operating the system 10 with various size and/or type trains 12, allowing rapid reconfiguration and re-networking to control a given train 12, such as when cars 16 and/or locomotives 14 are swapped out. The controller 32 may be configured to automatically detect and/or connect with proximate sensors 22 and/or braking subsystem 26 to form a network. Data transmission may be encrypted.

The wired and/or relatively short-range wireless options shown and/or described herein may allow greater data security in operating the system 10 such as by providing closed transmission of information. The controller 32 may be configured to automatically detect and/or connect with sensors 22 and/or braking subsystem 26 in wired connection therewith.

The use of dedicated control subsystems 34 may provide for single point access to all sensors 22 and/or braking subsystems 26 of a given car 16 and/or locomotive 14 to allow ease of communication and network formation, such as upon coupling or decoupling of the cars 16 and/or locomotives 14. In this fashion, a network may be created by joining more cars 16 and/or locomotives 14 together to form a train 12.

Each coupling 30 of the train 12 may comprise one or more wireless (e.g., near field communication) devices 62, such as but not limited to those utilizing Bluetooth® technologies, radio frequency identification (RFID) technology, combinations thereof, or the like, though longer-range wireless devices may be utilized. Such devices may be configured to automatically pair upon when co-located within a distance approximating a coupled car 16 or locomotive 14 for the train 12, by way of non-limiting example. Alternatively, or additionally, each of the couplings 30 may comprise electrically conductive surfaces 64, such as at or near mating portions thereof, which contact or are placed in sufficient proximity upon coupling. Alternatively, or additionally, electrical and/or electronic connection lines 66, such as which may include plugs and/or outlets, may be provided at each coupling 30 for the cars 16 and/or locomotives 14 of the train 12 which may be aligned and otherwise configured for automatic connection when coupled, and/or positioned and configured for manual connection before or after coupling. These may provide for manual or automatically connection through wired or wireless means between the various components of the system 10 for a given train 12.

The couplings 30 may comprise one or more automatic decoupling devices 68, such as motors, actuators, pistons, explosives, pneumatics, combinations thereof, or the like. These components may be configured to automatically move the couplings 30 out of a mating relationship, such as by forcing at least one of the couplings 30 open, or the like. The decoupling devices 68 may be configured to provide automatic decoupling, in exemplary embodiments without limitation. The couplings 30 may be in electronic communication with the controller 32 and/or control subsystem 34, which may be configured to automatically command decoupling of one or more cars 16 when any of the parameters are met or exceeded. In this fashion, the couplings 30 may serve as a safety device. In this way, potentially problematic cars 16 may be automatically decoupled, such as to prevent a larger scale derailment and/or facilitate movement onto a siding so that the train 12 may continue. The couplings 30 and/or decoupling devices 68 may be electrically powered by the power supply 52 in exemplary embodiments, without limitation, such as to permit each car 16 to be independently operated and powered in this regard, such as after decoupling, though such is not necessarily required. While certain features may be shown and/or described with particular regard to FIG. 2, these features may be utilized with any embodiment shown and/or described, such as with regard to FIGS. 1 and 3 by way of non-limiting example.

The wireless transmitter/receiver 33 may be in wireless electronic communication with one or more remote devices 42. In exemplary embodiments, without limitation, a first set of one or more of the remote devices 42A may be each associated with a respective, directly interested party 48. The directly interested parties 48 may include, for example without limitation, the railroad, train 12, locomotive 14, and/or car 16 owner(s), renter(s), lessor(s), and/or operator (s). A second set of one or more of the remote devices 42B may be each associated with a respective independent third-parties 44. The independent third-parties 44 may include, for example without limitation, various governmental authorities (e.g., law enforcement, regulatory, agencies, combinations thereof, or the like), such as at a local level, though any level governmental (e.g., state, federal, etc.) and/or other independent third party may be utilized (e.g., union, trade association, manufacturer, testing laboratory, non-governmental regulatory body, combinations thereof, or the like). Any number of remote devices 42 associated with any number of parties, directly interested or otherwise, may be part of the system 10.

The remote devices 42 may comprise servers, computers, tablets, smartphones, dedicated computer appliances, combinations thereof, or the like. However, the remote devices 42 may be associated with any party, and the controller 32 may be in communication with any number or type of remote devices 42. The controller 32 and/or dedicated control subsystem 34 may comprise servers, computers, tablets, smartphones, dedicated computer appliances, combinations thereof, or the like. In exemplary embodiments, at least the remote devices 42 and the controller 32 comprise dedicated appliances configured to operate on a closed network, such as to reduce or prevent tampering with safety parameters, train 12 operations, and/or other aspects of the system 10. The closed appliances may utilize a dedicated format for signaling, such as which uses various encryption, authentication, decryption, transmission, and other standards and protocols. The remote devices 42 may be physically housed in buildings associated with the local jurisdictional authorities 44, 48 and kept under various security protocols (e.g., electronic and/or physical), though such is not necessarily required.

The controller 32 may comprise, or be in electronic communication with, one or more databases 36. The database(s) 36 may comprise and/or be configured to receive, transmit, and/or store safety parameters, data readings from the sensors 22, authentication information for authorized parties, safety protocol routines, command logs, operating routines, combinations thereof, or the like.

The controller 32 may comprise, or be in electronic communication with, one or more location tracking devices 40. The location tracking devices 40 may comprise GPS devices, cellular triangulation devices, combinations thereof, or the like.

The controller 32 may comprise one or more electronic storage devices, which may include the databases 36 and/or software instructions, and/or processors 38, such as for carrying out the software instructions. The software instructions may be configured to provide some or all of the features and/or functionalities shown and/or described herein.

The remote devices 42 may comprise one or more authentication subsystems or modules for accepting and/or verifying authentication information. Such more authentication subsystems or modules may comprise user interfaces, keyboards, keypads, biometric reading devices (e.g., fingerprint/handprint readers, fingerprint/handprint recognition software, voice recognition software, microphones, cameras, facial recognition software, pupil recognition software, combinations thereof, or the like), keycard readers, near field communication devices, ports (e.g., USB), authentication devices (e.g., keycard, USB device, hardware key, combinations thereof, or the like), combinations thereof, or the like. The authentication information may include, for example without limitation, user names, passwords, credentials, electronic keys, encrypted codes, biometric information, combinations thereof, or the like. The provided information may be verified locally at the remote devices 42 and/or remotely at the controller 32, such as but limited to by comparing the provided information against information stored at the database(s) 36.

The figures provided herewith do not necessarily provide call outs for each of the wheels 18, the sensors 22, axles 20, bearing subassemblies 24, braking subsystems 26, couplings 30, control subsystems 34, wiring 46, combinations thereof, or the like. However, where similar items are shown and/or described, those of ordinary skill in the art will recognize that the same or similar components may be provided.

The wheels 18 shown and/or described herein may be configured to contact the rails of the railroad track and may sometimes be referred to herein as railway track wheels.

The system 10 may include one or more transponders 54, such as shown with particular regard to FIG. 2. The transponders 54 may be configured to determine and/or report data regarding location of a respective one of the cars 16 to which it is attached or associated and/or information regarding cargo carried by the respective car 16. Some or all of the cars 16 may include an independent transponder 54 by way of non-limiting example. The transponders 54 may be continually operated, such as by transmitting information on a periodic basis, and/or selectively operated, such as only if/when any one or the safety parameters is met or exceeded. The transponders 54 may be operated independently, by the controller 32, and/or a respective one of the control subsystems 34 for the respective car 16.

In exemplary embodiments, without limitation, information from the transponders 54 may be automatically passed to one or more of the remote devices 42. For example, without limitation, information may be automatically transmitted to a respective one or ones of the remote devices 42 associated with a respective one or ones of the jurisdictional districts 60 the respective car 16 is within and/or within a predetermined proximity of. Alternatively, or additionally, the transponders 54 may be automatically activated, such as by the control system 32 and/or dedicated control subsystem 34, when one or more of the parameters are met or exceeded such that the transponders 54 are another safety device of the system 10. For example, without limitation, the transponder 54 may include, or be in electronic communication with, a location tracking device for determining when the car 16 is within a particular jurisdictional district 60. Geographic parameters for the districts 60 may be stored at the database (s) 36 for example without limitation. The cargo information may be pre-programmed into the transponder 54 or connected controller 32, 34 or other device, by way of non-limiting example.

The transponders 54 may be configured to transmit data to the controller 32, the control subsystems 34 (and then on to the controller 32, or to the remote devices 42 without the controller 32 interposed), and/or to the remote devices 42 without the controller 32 and/or control subsystems 34 interposed by way of non-limiting examples. Where the controller 32 is interposed, it may gather information from all the transponders 54 and/or control subsystem 34 for batch transmission to the remote devices 42, by way of non-limiting example. In this fashion, local jurisdictional authorities may receive information on trains 12, cars 16, engines 14, or the like passing through their respective districts 60.

As shown with particular regard to FIG. 2, each of the cars 16 may be independently monitored and/or operated, such as by way of a dedicated control subsystem 34. In certain exemplary embodiments, without limitation, each of the cars 16 may be independently operated, controlled, and/or powered. For example, without limitation, the dedicated control subsystems 34 may be operated independently of the controller 32 and may interface with the remote devices 42 without the controller 32 interposed. Alternatively, or additionally, the dedicated control subsystems 34 may independently monitor respective sensors 22 and/or exercise operational command of respective safety devices, such as without the controller 32 interposed.

Each car 16 may comprise an independent power supply 52. The power supply 52 may comprise, or be connected to, one or more batteries, generators, solar panels 56, wind turbines 58, combinations thereof, or the like. The power supply 52 may be configured to electrically power the dedicated control subsystem 34, the braking system 54, the sensors 22, the transponders 54, combinations thereof, of the like in an independent fashion, though such is not necessarily required.

Some or all of the aforementioned features may permit safety devices to be activated for individual cars 16, which may slow an entire train 12. This may, alternatively or additionally, allow individual, potentially problematic cars 16 to be decoupled and moved to a siding, for example, while the train 12 is permitted to travel on, for example without limitation. While the system 10 and/or components thereof may be applied to an entire train 12, the system 10 and/or components thereof may be applied to individual cars 16 and/or engines 14. In this fashion, the system 10 and/or components thereof may be applied to cars 16 carrying, or configured or designated to carry, hazardous, large, and/or heavy cargo by way of non-limiting example and be permitted to operate independently on such cars 16.

While certain features may be shown and/or described with particular regard to FIG. 2, these features may be utilized with any embodiment shown and/or described, such as with regard to FIGS. 1 and 3 by way of non-limiting example.

Figure 4:
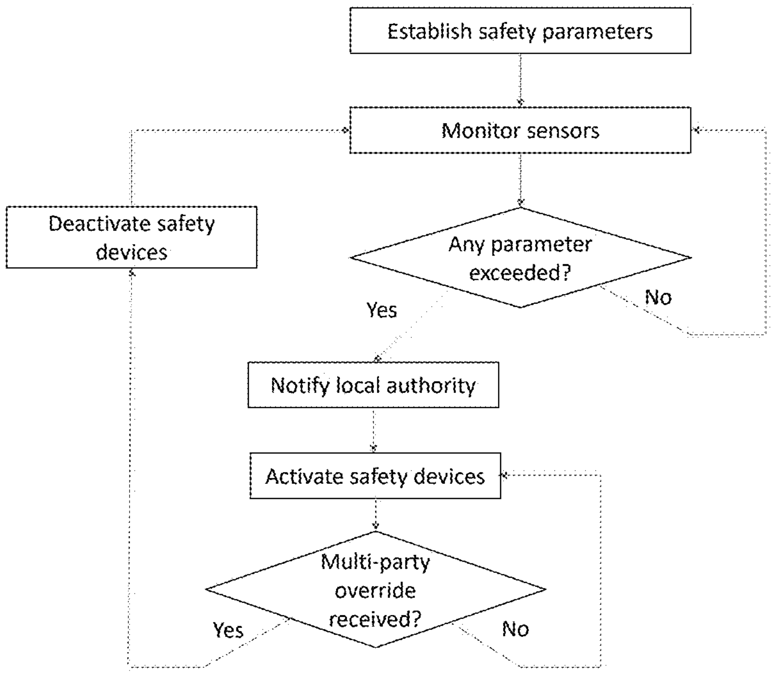
FIG. 4 is a flow chart with exemplary logic for operating the system of FIGS. 1-3.

FIG. 4 illustrates an exemplary method for operating the system 10. Safety parameters may be established. These parameters may include acceptable temperature and/or frequency readings from the sensors 22, though any type or kind of parameter may be utilized. The parameters may, by way of non-limiting example, reflect temperatures at which the axles 20 and/or bearings of the bearing subassemblies 24 may change state or otherwise experience failure or danger of failure. Alternatively, or additionally, the parameters may reflect frequencies associated with abnormal operations, failure events, and/or danger of failure events of the axles 20 and/or the bearing subassemblies 24. Alternatively, or additionally, the parameters may reflect temperatures and/or frequencies associated with abnormal operations, failure events, and/or danger of failure events of the propulsion systems 50. Any type or kind of parameters may be utilized. The parameters may be thresholds, ranges, combinations thereof, or the like. The parameters may include safety margins, such as from an anticipated failure or problem point. The safety margins may be any amount or percentage, such as but not limited to 30%. Any type or size margin may be utilized. The parameters may be set in accordance with various regulations promulgated by independent laboratories, governmental authorities and/or regulators, railroad owners and/or operators, trade associations, unions, combinations thereof, or the like. The safety parameters may be stored at the database(s) 36.

Data from the sensors 22 may be received and compared against the stored parameters, such as at the controller 32. The data may be received on a real-time, or substantially real-time basis. Substantially real-time may include accounting for normal and customary delays in transmission, processing, and the like.

Where any one or more parameters are exceeded, such as on a discrete basis, a predetermined number of times within a given time period, or the like, the controller 32 may be configured to automatically activate one or more safety devices. The safety devices may include, for example without limitation, propulsion system 50 reduction routines, propulsion system 50 shut down routines, braking commands for the braking subsystems 26, speed reduction routines for the braking subsystems 26 and/or propulsion system 50, command system and/or user input disablements for operator interfaces of the locomotives 14 and/or certain input therefrom (e.g., resuming or increasing propulsion, deactivating safety devices, combinations thereof, or the like), combinations thereof or the like. These routines and/or commands may be configured to cause operations to be performed at the braking subsystems 26, the propulsion systems 50, the transponders 54, the couplings 30, and/or operator interfaces, such as activating or increasing braking forces provided, decreasing or shutting off propulsion, activating the transponders 54, decoupling cars 16, deactivating operator interfaces (or certain features or commands thereof), combinations therefor, or the like.

The command system and/or user input disablements may include, but are not necessarily limited to, software commands blocking at least certain user input (e.g., resuming or increasing propulsion, deactivating safety devices, combinations thereof, or the like) from being received at and/or fully and/or normally processed, and/or activation of hardware disablements, such as electronic and/or physical switch decoupling, motorized, actuator, and/or spring driven shields that physically block access to or movement of at least certain of the operator interfaces controls of the locomotives 14, combinations thereof, or the like. The command system and/or user input disablements may sometimes be referred to herein as lockouts. The lockouts may be automatically activated by the control system 32 and/or dedicated control subsystems 34 when one or more safety parameters are met or exceeded. The lockouts may serve as one of the safety devices.

In exemplary embodiments, without limitation, the system 10, such as by way of one or more routines programmed at the control system 32 and/or dedicated control subsystems 34, may be configured to first attempt to slow the train 12 by way of the propulsion systems 50 slowing and/or ceasing propulsion, such as in conjunction with operator interface lockouts. If slowdown is not achieved, or not achieved in a desired fashion (e.g., at or exceeding a predetermined rate, speed threshold, or the like), the system 10 may be configured to activate other safety devices, including the braking subsystems 26 and/or coupling devices 30.

Where any safety parameter is met or exceeded and/or any safety devices are activated, such as in accordance with the foregoing, the controller 32 may be configured to automatically transmit an electronic notification indicating the same to one or more of the remote devices 42. The controller 32 may be configured to continue to activate and/or apply the safety device unless and until authenticated override commands or authorizations are received from at least two, or any predetermined number of, approved parties 48, 44. In exemplary embodiments, without limitation, this may include receiving authentication information that is verified at the databases 36 and/or indication of successful authentication received from the remote devices 42 and/or an override command or authorization.

The parties 48, 44, may include at least one representative of a railroad owner and/or operator and/or at least one representative of a geographically proximate, applicable third-party authority, though such is not required. Alternatively, or additionally, without limitation, the representative of the railroad owner and/or operator need not necessarily be remote or received from a device 42 which is physically remote from the train 12. For example, without limitation, the train 12 engineer, conductor, operator, or the like may be approved to provide one of the multiparty authenticated overrides. Such authenticated override commands may be received at the controller 32, such as from one or more operator interfaces of one or more of the locomotives 14 of the train 12 or a remote device 42 located at the train 12 (but physically separate, and thus remote from, the controller 32, 34 in exemplary embodiments, without limitation). Any number or type of parties may provide the override authorizations. The geographically proximate, applicable third-party (e.g., governmental) authority 44 may be one or more governmental authorities, such as law enforcement, executive offices, regulatory agencies, combinations thereof, or the like. Where no such multi-party override is received, the controller 32 may be configured to continue to operate the safety devices, such as so the train 12 and/or locomotives 14 can no longer move under its own power. The controller 32 may be configured to only deactivate the safety devices where the multi-party override is received.

Figure 5:
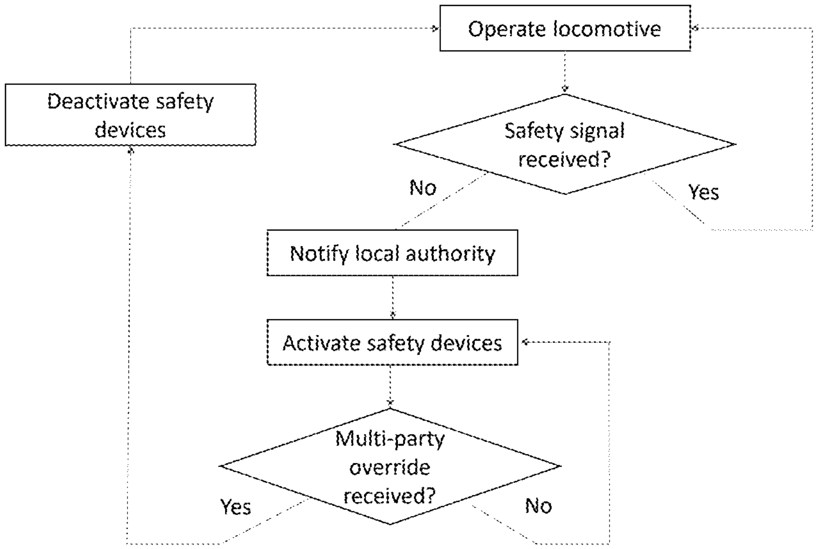
FIG. 5 is a flow chart with other exemplary logic for operating the system of FIGS. 1-3.

FIG. 5 illustrates another exemplary method for operating the system 10. The controller 32 may, alternatively or additionally, be configured to operate a safety subroutine whereby normal operations of the locomotive(s) 14 are only permitted so long as a safety signal is consistently received from one or more remote devices 42, such as associated with the interested party 48, the proximate third-party authority 44, and/or at least two or any predetermined number of the approved parties 44, 48. The safety signal may be provided in the form of an authenticated signal, encrypted key, password, presentation of an authentication device, combinations thereof, or the like. Where the safety signal is not received, the controller 32 may be configured to automatically activate one or more of the safety devices. The controller 32 may be configured to only deactivate the safety devices where the multi-party override is received. Successful receipt of the safety signal may be required by the controller 32 on a periodic basis, such as every 1 minute, 10 minutes, 1 hour, 2 days, combinations thereof, or the like. Any time period may be utilized.

Figure 6:
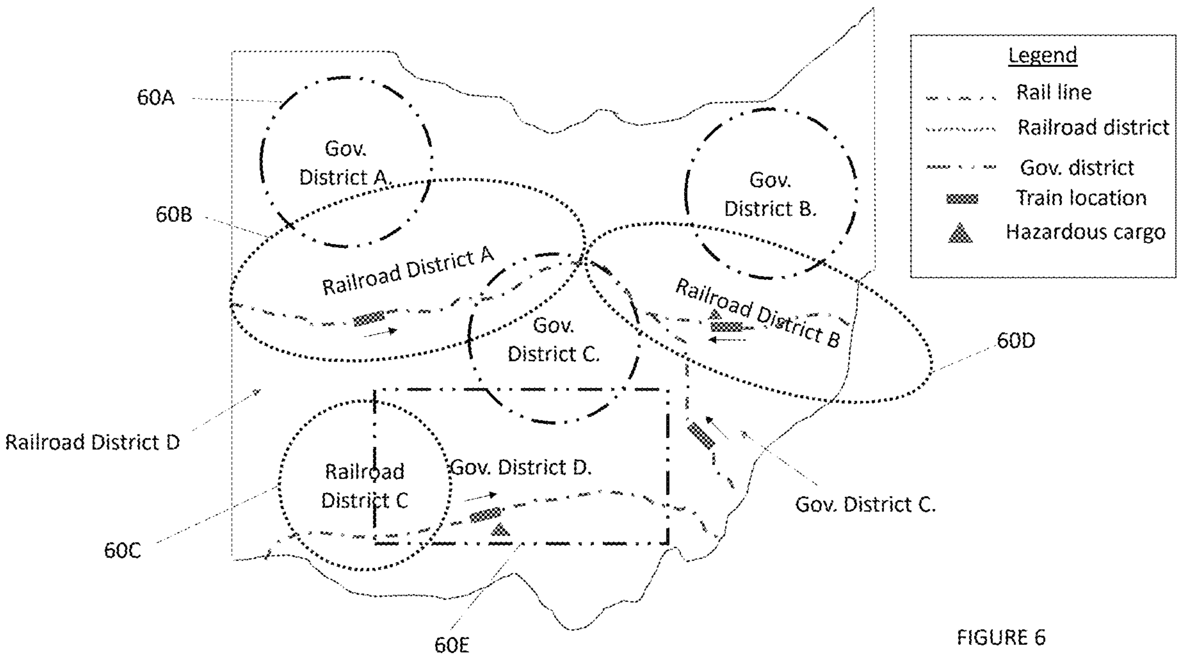
FIG. 6 is a plan view of an exemplary jurisdictional map for use with the systems and methods of FIGS. 1-5.

FIG. 6 illustrates an exemplary jurisdictional map for the system 10. In exemplary embodiments, the controller 32 may be configured to track or determine a location of the train 12 and/or cars 16 or locomotives 14 thereof. The controller 32 may be configured to additionally determine a direction and/or speeds of travel for the train 12, cars 16, and/or locomotives 14 thereof, such as to determine if an authority 44, 48 in advance of the train's 12 travel should be notified. Such information may be derived from data received from the location tracing device 40, propulsion system 50, and/or transponders 54 by way of non-limiting example. The display may alternatively or additionally include cargo information, such as stored at the database(s) 36, transponders 54, or the like. The cargo information may include a symbol for trains 12 and/or cars 16 carry cargo classified as hazardous, oversized, particularly large or heavy, combinations thereof, or the like. Detailed information may be provided, such as upon user selection of trains 12 and/or cars 16 at the display, including cargo, speed, direction of travel information, combinations thereof, or the like for each train 12 and/or car 16.

In exemplary embodiments, without limitation, the controller 32 may be configured to automatically alert the applicable jurisdictional authority 44, 48 as well as the next jurisdictional authority or authorities 44, 48 along the train's 12 anticipated travel path. For example, without limitation, the controller 32 may be configured to automatically alert a next jurisdictional authority 44, 48 along the train's 12 anticipated travel path where the train's 12 location is reported as within a predetermined distance of a local jurisdictional boundary and the train 12 is reported as advancing out of the local jurisdictional boundary, such as at a speed above a given threshold, such as opposed to further within the local jurisdictional boundary and/or slow enough that the next authority 44, 48 need not be informed at the given time.

For example, without limitation, the controller 32 may be configured to determine an approximate stopping distance for the train 12, such as based on the trains 12 current speed, rate of slow, one or more predetermined factors (e.g., assumed rate of slow, assumed stopping distance, combinations thereof, or the like) and may be configured to report to the remote devices 42 associated with all jurisdictional districts within a predetermined distance of the train's 12 current location and/or presumed stopping location following activation of the safety devices, for example.

The predetermined distances may be determined or varied based on the train's 12 and/or car's 16 reported cargo and/or weather conditions local to the train 12 and/or car 16, in exemplary embodiments without limitation. For example, without limitation, if the controller 32 determines that the train 12 and/or cars 16 are reported as carrying relatively non-hazardous cargo, the predetermined distance may be smaller as the main concern may be the physical impact of the cargo with surrounding objects. As another example, without limitation if the controller 32 determines that the train 12 and/or cars 16 are reported as carrying relatively hazardous cargo such as toxic chemicals, flammable material, or the like, the predetermined distance may be larger as concerns may include larger environmental impacts, fire, airborne toxins, or the like. The controller 32 may be configured to make such determinations based on criteria stored at the controller 32, such as at the database(s) 36. An example of criteria in this regard is provided at table 1 below without limitation. Any type or kind of criteria may be utilized with any amount of distance. The controller 32 may be configured to utilize the highest level of predetermined distance.

TABLE 1

| Cargo type | Predetermined distance |
|---|---|
| Non-flammable, non-toxic, normal size and weight | X miles |
| Flammable, non-toxic | Y miles |
| Toxic, non-flammable | Z miles |
| Toxic, flammable | A mile |
| Heavy | B miles |
| Oversized | C miles |

Alternatively, or additionally, the controller 32 may be configured to determine or vary the predetermined distance based on local weather conditions, such as but not limited to, prevailing winds, precipitation, ambient temperatures, or the like. For example, the predetermined distance may be varied and/or skewed in a particular direction based on windspeed and/or direction such that the predetermined distance is larger with higher windspeeds, or at least larger in a direction of the prevailing winds. As another example, without limitation, the presence of rain might decrease the predetermined distance for certain cargos (e.g., decreased risk of fire or airborne spread), or may increase the predetermined distance with other cargos (e.g., increased risk of carry into waterways).

The controller 32 may be configured to make such determinations based on criteria stored at the controller 32, such as at the database(s) 36. An example of criteria in this regard is provided at table 2 below without limitation. Any type or kind of criteria may be utilized with any amount of distance. The controller 32 may be configured to utilize the highest level of predetermined distance.

TABLE 2

| Weather conditions | Predetermined distance |
|---|---|
| Wind speed over A mph | X miles |
| Precipitation present | Y miles |
| Temperatures above B ° F. | Z miles |

The information of tables 1 and 2 is merely exemplary and not intended to be limiting. Any types or kinds of criteria and/or related distances may be utilized. The controller 32, in exemplary embodiments without limitation, may be configured to determine and/or vary the predetermined distance based on all relevant factors for a particular car 16 and/or train 12 and utilize the largest of the predetermined distances for notifications.

Where the electronic notifications are transmitted or the multi-party override is received, the controller 32 may be configured to automatically transmit such notification and/or requests for override to the application local third-party authority 44 and/or interested authority 48 representative, which may have the same or different jurisdictional coverage. Similarly, the controller 32 may be configured to seek consistent input of the safety signal for the applicable local third-party authority 44 and/or interested party 48 representative based on the location of the train 12. FIG. 6 is illustrated with particular regard to the state of Ohio to illustrate various exemplary jurisdictional districts 60A, 60B, 60C, etc. thereof for the parties 44, 48, by way of non-limiting example. Any number, size, and/or shape of jurisdictional districts 60 covering any number, size, and/or shape geographic areas for any number or type of parties may be utilized. Where no particular territory area is covered, in exemplary embodiments without limitation, a nearest district 60 may be located and/or a default authority may be assigned or utilized. The illustrated railroad routes are merely exemplary and not intended to be limiting. Where overlap is provided, the controller 32 may be configured to accept an authenticated override command from just one of the overlapping parties or may be configured require the authenticated override command from both. Any size, shape, number, and/or type of districts 60 may be utilized. Each district 60, default authority, or the like may be associated with a respective remote device 42, and/or remote devices 42 may be shared.

One or more graphical displays or interfaces with the information of FIG. 6 or similar variations thereof, may be displayed by the controller 32 at the remote devices 42, such as upon user request. The controller 32 may be configured to record and display additional information, such as but not limited to, direction of train 12 travel, identifying information for the train 12, cargo information for the train 12, owner and/or operation information for personnel assigned to the train 12, combinations thereof, or the like. Some or all of such information may be stored and/or retrieved from the database 26 though such is not required.

Figure 7:
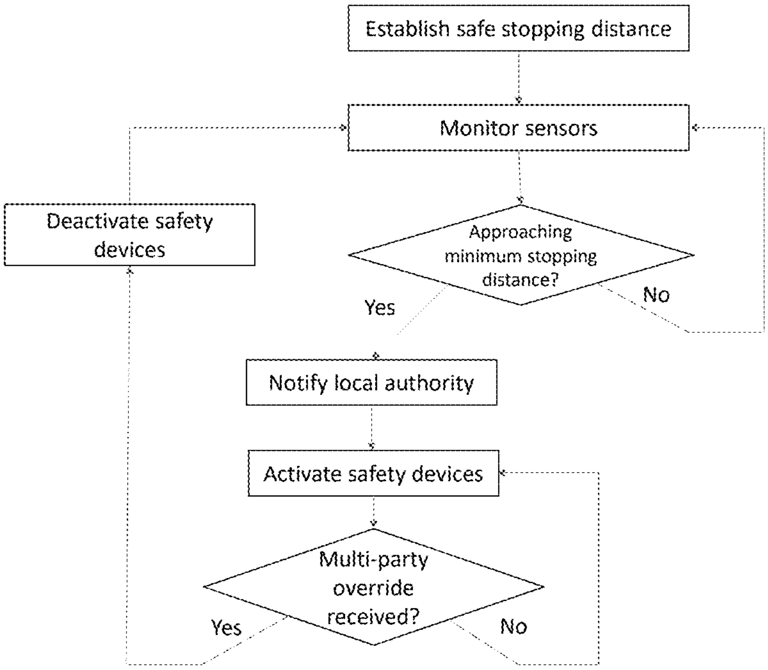
FIG. 7 is a flow chart with other exemplary logic for operating the system of FIGS. 1-3 and/or 8.

As illustrated with particular regard to FIG. 7, in exemplary embodiment, without limitation, the controller 32 may be configured to determine a minimum safe stopping distance between the train 12 and one or more other trains 12 on the same track. The position of the other train(s) 12 may be determined based on information gathered at the controllers 32 or otherwise of such train(s) 12 and transmitted to the train 12, directly or by way of one or more intermediary systems. The minimum safe stopping distance may be based on some or all of the parameters described herein, including but not necessarily limited to, each train's speed and position (absolute or relative), ambient weather conditions, regulations or guidelines, rail conditions, slope/grade, component conditions, combinations thereof, or the like, and may include a margin of safety which may be jurisdiction specific. By way of non-limiting example, the minimum safe stopping distance ("MSSD") (e.g., in meters) may be determined in accordance with the following equation:

$$\text{MSSD}=Sf\times(v^2/(2\times D\times Cf))$$

where: v is a ground speed of the train 12 (e.g., in km/h), D is a deceleration of the train 12 when the safety device(s) is/are applied, Cf is a coefficient of friction, and Sf is a safety factor which is determined in accordance with multiple parameters, including but not necessarily limited to: ambient weather conditions, regulations or guidelines, rail conditions, slope/grade, component conditions, jurisdiction specific safety factors, general safety factor, combinations thereof, or the like. Some or all of the parameters for the safety factor may be based on a lookup table, by way of non-limiting example. In exemplary embodiments, without limitation, some or all of the parameters are summed to arrive at the safety factor. Some or all of the parameters may be weighted, such as in in a predetermined fashion. Alternatively, or additionally, other techniques may be used such as averaging, weighted averages, and the like. The coefficient of friction may be determined based on a lookup table and known information such as train 12 weight and/or parameters (e.g., ambient weather conditions). Alternatively, or additionally, the MSSD may be determined based on relative speed such that v is a relatively speed of the train 12 compared to another train.

The lookup table criteria, parameters, coefficient of friction, and/or weightings, by way of example, may be improved over time, such as by way of one or more artificial intelligence techniques. For example, without limitation, actual breaking distances of the train 12 and/or other trains 12 may be monitored, such as by way of the controller 32, and reported back to a MSSD model to improve accuracy of the results over multiple iterations. Alternatively or additionally, modeling of various conditions may be performed by the controller 32 or remote devices and fed to the MSSD model to iteratively improve accuracy of the results.

If the MSSD is exceeded, the safety devices (e.g., brakes, control lock outs, automatic slow down, etc.) may be activated, such as unless and until the multi-party override is received. The MSSD may be adjusted on an ongoing basis (e.g., real time, continuous, periodic, or the like) based on sensed conditions and/or changing parameters.

The controller 32 may, alternatively or additionally, be configured to permit each train 12 to increase speed and/or automatically increase speed, at least up to a local speed limit, so long as the minimum safe distance is maintained. The controller 32 may be configured to automatically adjust speed to reach or stay under the local speed limit and/or maintain the minimum safe distance. Such speed adjustments may be made on in accordance with a predetermined acceleration limit. The acceleration limit may be adjusted in accordance with one or more of the parameters, and may be determined by a lookup table, for example without limitation.

Figure 8:
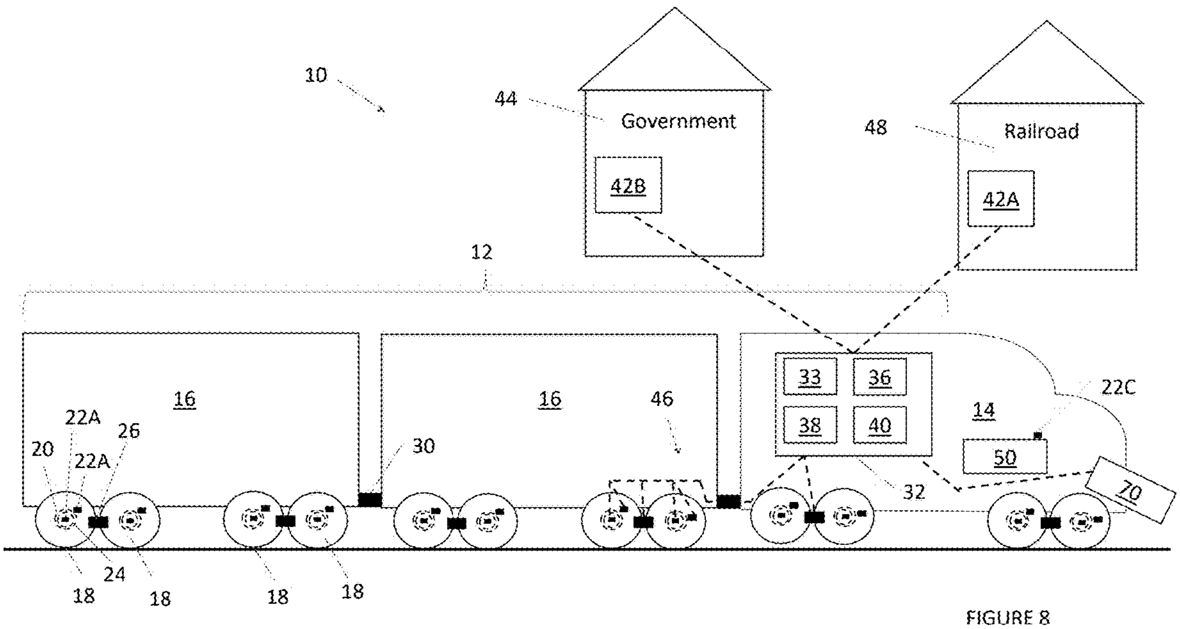
FIG. 8 is a simplified diagram for another exemplary embodiment of the railroad safety system of FIG. 1.

As illustrated with particular regard to FIG. 8, the train 12 and/or cars thereof may comprise a forward-looking sensor unit 70 (hereafter also the "forward sensor"). The forward sensor 70 may comprise one or more cameras and/or other optical sensor(s) (e.g., photo sensor, laser) configured to image or otherwise sense track conditions. The track conditions data from the forward sensor 70 may be provided to the controller 32, such as for machine vision analysis thereof. For example, without limitation, the machine vision analysis may be configured to look for bumps in the rails, track deviation for an expected orientation by a predetermined amount (e.g., 10% or greater), misaligned or missing spikes, combinations thereof, or the like). Based on the number and severity of track issues encountered over a predetermined distance, the controller 32 may be configured to grade the track (e.g., excellent, acceptable, poor) and adjust the minimum safe stopping distance and/or local speed limit according, such as by adjusting one or more parameters thereof. For example, without limitation, a relatively worse grade may result in an increased minimum safe stopping distance and/or decrease of the local speed limit by adjusting the safety factor (Sf) thereof. The sensors of the forward sensor 70 is/are preferably forward facing and downward looking on an forwardmost engine 14 of the train 12.

Figure 9:
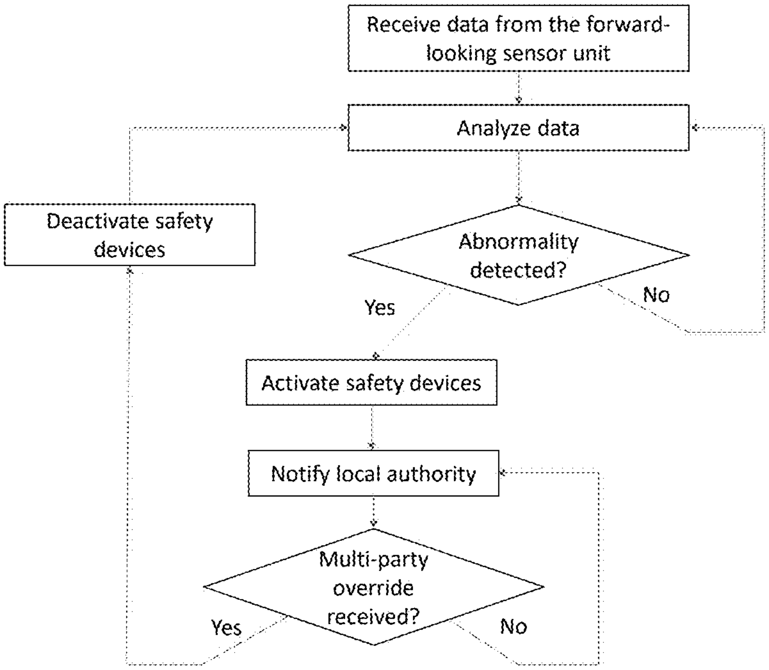
FIG. 9 is a flow chart with exemplary logic for operating the system of FIG. 8.

As illustrated with particular regard to FIG. 9, the controller 32, based, at least in part, on data received from the forward sensor 70, may be configured to monitor for abnormalities, such as actual or potential obstructions, such as individuals, vehicles, objects, combinations thereof, or the like on upcoming track and may be configured to activate the safety devices (e.g., brakes, control lock outs, automatic slow down, etc.) when such obstruction(s) are detected.

The controller 32 may be configured to search for such obstruction(s) on the track itself and/or within a predetermined distance thereof (e.g., 10 ft by way of non-limiting example). For example, without limitation, image data received from the forward sensor 70 may be analyzed by the controller 32 using machine vision to detect obstructions, such as by outline of the obstruction by way of non-limiting example. Alternatively, or additionally, the data may include proximity sensor data, distance sensor data, combinations thereof, or the like. Where objects are detected at a distance less than an expected distance, such as of track distance, or minimum expected clearance around the track, the controller 32 may be configured to interpret the presence of such an object as an obstruction.

By analyzing data (e.g., images) form the forward sensor 70 over time (e.g., in sequence), the controller 32 may be configured to determine if a sensed obstruction is moving towards or away from the track, and may activate or not activate the safety devices accordingly (e.g., activate where obstruction on track and/or moving towards track, not activate where obstruction not within distance of track and/or moving away from track).

In exemplary embodiments, without limitation, the controller 32 may be configured to maintain activation of the safety devices unless and until a multi-party override is received, such as shown and/or described herein.

Alternatively, or additionally, the controller 32, based, at least in part, on data received from the forward sensor 70, may be configured to monitor for track orientation against known or expected track orientations, which may be determined to be an abnormality. For example, without limitation, the data from the forward sensor 70 may be analyzed by the controller 32, such as using machine vision, to determine track orientation. The controller 32 may be configured to query a database 36 of, such as on a geographic specific basis based on data from the location tracking device 40, of known track orientation. If the detected track orientation is not within a predetermined margin (e.g., 10%) of the known track orientation, the controller 32 may interpret this as a potential shift in track that could cause derailment and activate the safety devices accordingly. Alternatively, or additionally, the controller 32 may be configured to analyze the detected track orientation against predetermined acceptable orientations (e.g., track curvature up to a predetermined percentage from linear over a predetermined distance). If the detected track orientation is not within acceptable parameters, the controller 32 may interpret this as a potential shift in track that could cause derailment and activate the safety devices accordingly.

Alternatively, or additionally, the controller 32 may be configured to monitor actual track conditions (e.g., surface flatness, curvature of upcoming rail lines, track orientation, etc.) detected by data from the forward sensor 70 against predetermined acceptable track parameters, such as, acceptable levels of track curvature, track surface (e.g., flatness of head of rail), track orientation (e.g., head angle, head width, angle of web between head and base, curvature along longitudinal axis of rail, distance to check rails, orientation of switches, etc.), presence, size, and/or orientation or objects on rail (e.g., stones, coins placed on rail), combinations thereof, or the like. Sensed conditions not meeting the predetermined criteria may be considered abnormalities. The controller 32 may detect misaligned track, bumps in the track, shifting track, objects on track, missing items (e.g., ties, sleepers), misaligned objects (e.g., switchers, check rails), combinations thereof, or the like. The controller 32 may be configured to activate the safety devices (e.g., brakes, control lock outs, automatic slow down, etc.) where unacceptable conditions are detected. For example, without limitation, the controller 32 may utilize machine vision, proximity detection, combinations thereof, or the to determine conditions and measure those conditions against acceptable parameters. The safety devices may remain active unless and until a multi-party override is received.

Some or all of these features may provide for at least partially autonomous safety control of the train 12.

In exemplary embodiments, without limitation, the forward sensor 70 may comprise multiple sensors (e.g., cameras, photo eyes, lasers, combinations thereof, or the like), such as of a same of different type, such as with various levels of range and/or quality (e.g., laser output power, camera optical zoom and/or megapixels), by way of non-limiting example. The forward sensor 70 may provide a relatively micro, standard, and/or macro view of upcoming track. The various levels of range and/or quality may be taken at a same or different time. Alternatively, or additionally, digital zooming may be provided. The various zoom levels may allow increased sensing of potential abnormalities (e.g., dangers), such as vehicles headed towards a railroad track crossing, upcoming objects on the track, upcoming track problems, combinations thereof, or the like.

In exemplary embodiments, without limitation, the controller 32 may be configured to initially sense potential abnormalities, such as by machine vision and/or light detection and ranging (LIDAR) analysis, of a relatively macro zoom level image data and/or a first data type (e.g., from first type of sensor), and confirm the abnormalities by a relatively standard or micro zoom level image data and/or a second data type (e.g., from second type of sensor) before initiating the safety devices. This may decrease the likelihood of unnecessary activation of the safety devices. Some or all safety devices may be implemented in each scenario, such as based on the item(s) detected by the controller 32.

Certain operations described herein may be performed by one or more electronic devices. Each electronic device may comprise one or more processors, electronic storage devices, executable software instructions, combinations thereof, and the like configured to perform the operations described herein. The electronic devices may be general purpose computers or specialized computing devices. The electronic devices may comprise personal computers, smartphone, tablets, databases, servers, or the like. The electronic connections and transmissions described herein may be accomplished by wired or wireless means. The computerized hardware, software, components, systems, steps, methods, and/or processes described herein may serve to improve the speed of the computerized hardware, software, systems, steps, methods, and/or processes described herein. The electronic devices, including but not necessarily limited to the electronic storage devices, databases, controllers, or the like, may comprise and/or be configured to hold, solely non-transitory signals.

What is claimed is:

1. A safety system for a train, the system comprising:

a forward-looking sensor unit located at an engine of the train and comprising cameras, including a first camera having a first level of resolution and a second camera having a second level of resolution;

one or more safety devices located at a car or the engine of the train, which when activated, slow the train;

a control system in electronic communication with the forward-looking sensor unit and the one or more safety devices, said control system comprising one or more non-transitory electronic storage devices comprising software instructions, which when executed, configure one or more processors of the control system to:

receive data from the forward-looking sensor unit;

process the received data using machine vision to determine if one or more abnormalities meeting predetermined criteria are present, including by:

making an initial determination that the at least one or more of the one or more abnormalities is present based, at least in part, on the data received from the first camera; and confirming of the presence of at least one or more of the one or more abnormalities based, at least in part, on data received from the second camera; and where confirmation of the presence of at least one of the one or more abnormalities is determined, activate at least one of the one or more safety devices.

2. The safety system of claim 1 wherein:

at least two of the cameras have different levels of optical zoom.

3. The safety system of claim 1 wherein:

the forward-looking sensor unit comprises a laser;

the control system is further configured to process data received from the laser using light detection and ranging.

4. The safety system of claim 1 wherein:

the one or more abnormalities comprise an object on upcoming track.

5. The safety system of claim 1 wherein:

the one or more abnormalities comprise an object moving towards upcoming track.

6. The safety system of claim 1 further comprising:

a database of geographically coordinated known track layout; and a location tracking device located at the engine and in electronic communication with the control system, wherein the one or more non-transitory electronic storage devices of the control system comprise additional software instructions, which when executed, configure the one or more processors of the control system to:

receive data from the location tracking device;

determine a location of the train based on the data received from the location tracking device;

query the database to retrieve a portion of the known track layout specific to the location;

analyze the data received from the forward-looking sensor unit to determine an actual track layout; and compare the actual track layout to the portion of the known track layout, wherein the one or more abnormalities include instances where the actual track layout is outside of a predetermined margin of the portion of the known track layout.

7. The safety system of claim 1 wherein:

the one or more non-transitory electronic storage devices of the control system comprise additional software instructions, which when executed, configure the one or more processors of the control system to:

analyze the data received from the forward-looking sensor unit to determine an actual track condition; and compare the actual track condition to predetermined acceptable track conditions, wherein the one or more abnormalities include instances where the actual track condition is outside of the predetermined acceptable track conditions.

8. The safety system of claim 1 further comprising:

one or more sensors, each located at an engine or car of the train and in electronic communication with the control system;

a first remote device in electronic communication with the control system;

a second remote device in electronic communication with the control system; and a database of safety parameters provided at, or in electronic communication with, the control system, wherein the one or more non-transitory electronic storage devices of the control system comprise additional software instructions, which when executed, configure the one or more processors of the control system to:

receive data from the one or more sensors;

determine if the received data from the one or more sensors exceeds any of the safety parameters;

if a determination is made that the received data from the one or more sensors exceeds any of the safety parameters:

activate the one or more safety devices, and transmit an electronic notification indicating activation of the one or more safety devices to the first remote device and the second remote device; and prevent deactivation of the one or more safety devices unless and until an authenticated override authorization is received from both of: the first remote device and the second remote device.

9. The safety system of claim 8 wherein:

the one or more sensors comprise:

a first sensor located proximate to an axle of the car or engine; and a second sensor located proximate to a bearing for the axle;

the one or more sensors comprise at least one of a temperature sensor and a frequency sensor; and the safety parameters comprise at least one of a component temperature threshold and a frequency threshold or range.

10. The safety system of claim 8 wherein:

the safety parameters comprise a speed limit and a minimum safe stopping distance.

11. The safety system of claim 8 further comprising:

a network communication device facilitating wireless network internet-based communication between the control system, the first remote device, and the second remote device, wherein each of the first remote device, the second remote device, and the control system comprises a dedicated appliance, and wherein the control system is in electronic communication with the first remote device and the second remote device within a closed network by way of the dedicated appliances.

12. The safety system of claim 8 wherein:

the first remote device is associated with a railroad operations authority; and the second remote device is associated with a governmental authority.

13. The safety system of claim 1 wherein:

the one or more safety devices comprise any one or more of: an automated braking subsystem for a brake system of the car or engine, a subroutine stored at the one or more electronic storage devices, which when executed, configures the one or more processors to reduce an operational power level of a propulsion system of the engine for the train, and a subroutine stored at the one or more electronic storage devices, which when executed, configures the one or more processors to electronically prevent certain user input at operator interfaces for the engine of the train from full or normal processing.

14. The safety system of claim 1 wherein:

the forward-looking sensor unit is mounted to a forward-most engine of the train and comprises one or more sensors oriented to face forward at a downward angle.

15. A method for operating the safety system of claim 1 for a train, the method comprising:

receiving data from the forward-looking sensor unit;

processing the received data at the control system to determine if the one or more abnormalities meeting predetermined criteria are present; and confirming the presence of at least one or more of the one or more abnormalities by way of the control system, and in response, activating at least one of one or more safety devices located at a car or the engine of the train and in electronic communication with the control system, thereby slowing the train.

16. A safety system for a train, the system comprising:

a forward-looking sensor unit located at an engine of the train comprising multiple cameras with different levels of optical zoom and oriented to view forward at a downward angle;

safety devices located at a car or the engine of the train, which when activated, slow the train; and a control system in electronic communication with the forward-looking sensor unit, the safety devices, a first remote device, and a second remote device, said control system comprising one or more non-transitory electronic storage devices comprising software instructions, which when executed, configure one or more processors of the control system to:

receive image data from each of the multiple cameras of the forward-looking sensor unit;

process the received data using machine vision to determine if any of candidate abnormalities are present, including by:

making an initial determination that one of the candidate abnormalities is present based on the received data from a first one of the multiple cameras; and confirming the presence of the one of the candidate abnormalities based on the data received from a second one of the multiple cameras;

where confirmation of the presence of the abnormality is determined, activate the safety devices, transmit an electronic notification indicating activation of the one or more safety devices to the first remote device and the second remote device, and prevent deactivation of the one or more safety devices unless and until an authenticated override authorization is received from both of: the first remote device and the second remote device.

17. The safety system of claim 16 wherein:

the first remote device is associated with a railroad operations authority; and the second remote device is associated with a governmental authority.

18. The safety system of claim 16 wherein:

the candidate abnormalities comprise an object on upcoming track, an object moving towards intersecting upcoming track, track conditions outside of predetermined acceptable condition parameters, and track orientation outside of expected track orientations for a known location of the engine by at least a predetermined margin; and the safety devices comprise any one or more of: an automated braking subsystem for a brake system of the car or engine, a subroutine stored at the one or more electronic storage devices, which when executed, configures the one or more processors to reduce an operational power level of a propulsion system of the engine for the train, and a subroutine stored at the one or more electronic storage devices, which executed, configures the one or more processors to electronically prevent certain user input at operator interfaces for the engine of the train from full or normal processing.

19. A safety system for a train, the system comprising:

a forward-looking sensor unit located at an engine of the train;

one or more safety devices located at a car or the engine of the train, which when activated, slow the train;

one or more sensors, each located at an engine or car of the train; and a control system in electronic communication with the forward-looking sensor unit, the one or more safety devices, the one or more sensors, a first remote device, a second remote device, and a database of safety parameters, said control system comprising one or more non-transitory electronic storage devices comprising software instructions, which when executed, configure one or more processors of the control system to:

receive data from the forward-looking sensor unit;

process the data received from the forward-looking sensor unit to determine if one or more abnormalities meeting predetermined criteria are present;

where confirmation of the presence of at least one of the one or more abnormalities is determined, activate at least one of the one or more safety devices;

receive data from the one or more sensors;

determine if the received data from the one or more sensors exceeds any of the safety parameters;

if a determination is made that the data received from the one or more sensors exceeds any of the safety parameters:

activate the one or more safety devices, and transmit an electronic notification indicating activation of the one or more safety devices to the first remote device and the second remote device; and prevent deactivation of the one or more safety devices unless and until an authenticated override authorization is received from both of: the first remote device and the second remote device.

* * * * *